US012445426B1

(12) United States Patent
Martirosyan et al.

(10) Patent No.: US 12,445,426 B1
(45) Date of Patent: Oct. 14, 2025

(54) DETERMINISTIC USER DEVICE IDENTIFICATION

(71) Applicant: INTENT.AI, INC., West Bridgewater, MA (US)

(72) Inventors: Harutyun Martirosyan, Yerevan (AM); Zaven Navoyan, Yerevan (AM); Aleksandr Yesayan, Yerevan (AM); Narek Baghdasaryan, Yerevan (AM); Karen Baldryan, Yerevan (AM)

(73) Assignee: INTENT.AI, INC., West Bridgewater, MA (US)

( * ) Notice: Subject to any disclaimer, the term of this patent is extended or adjusted under 35 U.S.C. 154(b) by 0 days.

(21) Appl. No.: 18/952,377

(22) Filed: Nov. 19, 2024

(51) Int. Cl.
*H04L 9/40* (2022.01)

(52) U.S. Cl.
CPC .................................. *H04L 63/08* (2013.01)

(58) Field of Classification Search
CPC ....................................................... H04L 63/08
See application file for complete search history.

(56) References Cited

U.S. PATENT DOCUMENTS

| 12,219,653 | B2 * | 2/2025 | Horelik | ............... | H04L 65/1104 |
| 2013/0310027 | A1 * | 11/2013 | Foti | ....................... | H04L 61/106 |
| | | | | | 455/432.1 |
| 2024/0275593 | A1 * | 8/2024 | Salmela | ............... | H04W 12/106 |

OTHER PUBLICATIONS

The Uniquity Chronicles: Exploring the Cosmos of Unique ID Algorithms—DEV Community https://dev.to/0xfedev/the-uniquity-chronicles-exploring-the-cosmos-of-unique-id-algorithms-31d60xFedev Jul. 16, 2023 (Year: 2023).*
Difference Between Source Port and Destination Port https://www.geeksforgeeks.org/difference-between-source-port-and-destination-port/ Jun. 1, 2022 (Year: 2022).*

* cited by examiner

*Primary Examiner* — Benjamin A Kaplan
(74) *Attorney, Agent, or Firm* — ARLUYS IP, P.C.

(57) ABSTRACT

Techniques are described for deterministic user identification by content providers. The process receives instance(s) of mapping data from Internet Service Providers (ISPs) and other sources, in an embodiment. The instances have been generated by mappings of identifiers assigned gateway devices to user devices when the gateway device(s) are used to route a content request(s) from the user devices to content providers on the Internet. The process receives an identification request for a content request that was received by a content provider and which indicates the external network identifier for the user device. In an embodiment, the process queries the instances of mapping data based, at least in part, on the external network identifier for the user device and obtains a unique identifier associated with the user device. This unique identifier is temporally static and unique among user devices. The unique identifier is sent to the content provider to identify the user device or the user thereof.

18 Claims, 6 Drawing Sheets

DETERMINISTIC USER DEVICE IDENTIFICATION

FIELD OF THE TECHNOLOGY

The present invention relates to the field of managing computer networks, in particular to deterministic user device identification.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The reach of the Internet has been growing year to year. More users now have access to the Internet than ever before. Such users, through their computing devices (e.g., smartphones, tablets, laptops, etc.), consume entertainment, transact business, interact on social media, and perform many other tasks over the Internet. The providers of such services to the users are referred to collectively and individually herein as "Internet content providers" or "content providers." The content providers need to identify each unique user and/or user device to provide a particularized experience.

To provide such an experience, an Internet content provider has to ensure that a request from a user device associated with one user is not confused with a similar request to the content provider from another user/user device. For sensitive content, such as financial or medical content, the content providers request users to authenticate themselves (e.g., providing a username and password) or even user devices (e.g., sending electronic mail confirmations about device accesses). Thus, once the user is authenticated and logged in, the Internet content provider dedicates a unique user session for the interaction and can provide user-specific content in a particularized and secure manner.

However, for non-sensitive content, requiring user authentication may be cumbersome and resource-intensive for content providers. For example, when a user accesses an informational website (e.g., a news website), the content provider of the news website would prefer to avoid requiring the user to authenticate, as it would be cumbersome for the user. Additionally, supporting user authentication incurs the cost of maintenance of a security infrastructure for the content provider. At the same time, the content provider would prefer to customize the user's experience based on the previous visit(s): arrange sections based on the user's preference, shift content that is similar to the previously accessed one closer to the top, and other common customizations.

One of the most common approaches to tracking users without requiring authentication is to install an HTTP cookie (metadata identifying the user and user preferences) on the user device's Internet browser. When the user device using its web browser connects to the content provider's web server, the web server of the content provider stores a small block of information about the user and the user preferences. The next time when the same web browser accesses the content provider, the web server reads the cookie and customizes the experience of the content according to the information in the cookie.

This approach may be problematic when the same user uses two different web browsers to access the Internet. The content provider identifies the accesses as two different users, and thus the content data provided to the web browser may be materially different.

Additionally, when a content provider receives a content request from a user device, there may be a hierarchy of other content providers to access the requested content. For example, when a web browser of a user requests content from a news content provider, a portion of that content (e.g., using AJAX technology) may be linked to another news content provider, a third-party content provider. Because the web browser of the user has not directly been accessed by the third-party content provider, the web browser may not allow the third-party content provider to store a cookie with the web browser. Web browsers, such as GOOGLE CHROME®, may prohibit such third-party cookies from being stored on its instances for privacy and security reasons.

Another approach for a content provider to identify a user is to track the user device associated with the user rather than the web browser of the user. Each request to a content provider contains the network identifying information, such as an Internet Protocol (IP) address, of the user device. However, because there is a shortage of IP addresses, the Internet Service Providers (ISP) use the same IP address for a pool of the ISP subscribing user devices in a dynamic manner. Thus, at different points in time, the same user device may have different IP addresses, and different user devices may have the same IP address. Even if the content provider stores mapping data identifying source IP addresses for the requests, the mapping will be outdated, and the content provider may only differentiate from which ISP the request has originated and not the actual user devices subscribed to the ISP.

BRIEF DESCRIPTION OF THE DRAWINGS

In the drawings of certain embodiments in which like reference numerals refer to corresponding parts throughout the figures.

DETAILED DESCRIPTION

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe deterministic user device identification. When a user device connects to a content provider (e.g., a web server thereof), the data from the user device is routed through multiple networks to reach the content provider. The term "core network" refers to a network of computing nodes to which ISPs and content providers are connected. The computing nodes connected to the core network(s) are identified with external network identifiers, which are unique throughout all the core networks and when accessing the Internet. A non-limiting example of an external network identifier is an external IP address.

When a content provider receives a request from a user device, the content provider receives the external network identifier of the user device. Such external network identifiers may have been assigned to the user device by the ISP to which the user device is connected for accessing the Internet.

Some ISPs may assign the same external IP address to multiple user devices because of the limited pool of IPv4 addresses, as discussed above. In such an example, an ISP may provide additional identifying information to the content provider that further identifies a user device for the ISP. A non-limiting example of an additional external network identifier is a source port number for an IP request. Accordingly, the external network identifier for a user device, in such an example, is a combination of the external IP address and the source port number, which together are unique at any point in time for the user device.

The external network identifier (the combination of external identifying information) for a user device may change at different points in time. The ISP may change the assignment when the user device requests a connection to a content provider at a later point. As discussed above, the re-use of external network identifiers and changes in the identifying information of a user device complicates the deterministic identification of the user device and correlating such a user device to a particular user.

The one or more networks through which a user device is connected to an ISP (and through ISP to the core network) are referred to herein as "access networks." When connected, the access network gateway maps the device identifying information (referred to herein as "device identifier") of the user device to the network identifying information for the user device on the access network, in an embodiment. Device identifiers are globally unique identifiers for the user device and rarely or never change and, thus, are considered temporally static. Non-limiting examples of device identifiers are IMSI (International Mobile Subscriber Identity), which is a unique number identifying a GSM subscriber of a cellular network; MSISDN (Mobile Station International Subscriber Directory Number), which is a unique phone number identifying a subscriber of a cellular network, MAC (Media Access Control) addresses uniquely identifying a network interface on the user device.

The access network gateway that maps a device identifier to the corresponding network identifying information of the device on the network maintains the mapping in device mapping data. A non-limiting example of device mapping data is a pre-NAT (Network Address Translation) table that maps device identifiers of mobile phones, such as IMSI and/or MSISDN, to local IP addresses (IPv4 or IPv6 address) provided by the phone carrier's ISP. Another non-limiting example is an ARP (Address Resolution Protocol) table, which maps the IP address mapping to the MAC (Media Access Control) addresses, a device identifier, for the user devices.

The network identifying information for a user device is unique within a particular access network and is referred to herein as a "local network identifier". Although the local identifier is unique within a particular access network, the identifying information may also be dynamically assigned by the network identifier assigning service (e.g., DHCP) of the access network. Additionally, multiple access networks may be used before the core network is reached, and each such access network is controlled by a gateway network device (referred to herein as gateway), which may assign a different network identifier to the same user device.

For example, a mobile phone may be connected to the cellular access network of a phone carrier through its cellular radio. The phone carrier, as an ISP, also provides the gateway from the cellular access network to the Internet through the core network. As such, the phone carrier assigns the smartphone a local network identifier within the ISP access network (local IP address). The pre-NAT table of the ISP serves as the mapping data for mapping local identifiers in the access network to device identifiers of mobile phones.

At or before the time of a request by a mobile phone to a content provider, the mobile phone carrier's core network gateway (e.g., NAT (Network Address Translation) router) may assign an external IP address and source port number to the mobile phone. The assignment is recorded in the core network gateway's network mapping data. A non-limiting example of such network mapping data is a post-NAT table. The phone carrier then forwards the request from the mobile phone to the content provider with the assigned external IP address and source port number. When a response to the request is received by the ISP from the content provider, the ISP uses the mapping data to route the response to the appropriate user device.

Techniques described herein include requesting one or more instances of mapping data and using the mapping data to identify the user (device) that originated a request to the content provider. The mapping data may be associated with the respective mapping timestamp. The term "mapping timestamp" for mapping data refers herein to the timestamp representing the time at which the mapping(s) in the mapping data are valid. The mapping timestamp may be the timestamp of the receipt of the mapping data (current timestamp) or the timestamp generated by the gateway that maintains the mapping data.

In an embodiment, the system periodically receives instances of mapping data recorded by the gateway(s) of ISPs and/or local networks. The instances of mapping data are stored and may be associated with the respective mapping timestamps.

When a request for a user or user device identification is received from a content provider, the process queries one or more instances of mapping data to determine the user or the user device based on the received external network identifier for the user/user device in the identification request.

The request for the user/user device identification may be received from a different content provider than the content provider that received the original request from the user device for content. For example, a web server of a local news content provider may receive a request for the current news content from a mobile phone of a user. In order to include national sports news in the provided content, the web server of the local news requests is either configured or triggered automatically to request the national sports news from a different content provider, the national sports news provider. The national sports news provider may prefer to provide the user with customized content for the user based on the previous history of the user. For example, in the past, the national sports news provider may have received requests from the same user/user device for primarily soccer content and thus would prefer to provide the soccer content to the user/user device if it was identified. To identify this user, the national sports news provider may request the deterministic identification of the user/mobile phone by providing the external IP and/or source port information received from the local news provider to the deterministic identification system.

In an embodiment, the deterministic identification request is associated with a timestamp. When no timestamp is provided in the content provider's request, the identification process uses the most recent mapping data to query for the user/user device based on the received external network identifier. Otherwise, the process uses the external network identifier to query the instance(s) of mapping data that are the most recent but no later than the provided timestamp and/or the temporally closest to the provided timestamp.

Additionally, to limit the number of instances of mapping data queried, the system may use the received external network identifier to identify the ISP through which the user device has requested content from the content provider. Based on the identified ISP, the system queries for the user/user device based on the instance(s) of mapping data of the identified ISP and not any other ISP.

In an embodiment, the identification process determines the local identifier(s) of the user device by querying instance(s) of network mapping data based on the received external network identifier for the user device. The local identifier(s) may then be used to iteratively query for another set of local identifiers for the user device until the full set of local identifier(s) are returned that are included in the device mapping data. The system queries device mapping data using the returned local identifier(s) to determine the user (device) identifier for the user device.

In an embodiment, the system may additionally maintain user mapping data, which maps device identifiers of devices with the user identifiers of the users associated with the devices. The user identifier may be opaque, and the system may generate a unique user identifier when no user identifier is found in the user mapping for a particular user device identifier. The generated user identifier is stored in the user mapping data in association with the particular user device identifier. When another request is received that maps to the particular device identifier, additionally or alternatively, the unique user identifier for the particular user device identifier is returned from the user mapping data.

Mapping Data Overview

Figure 1:
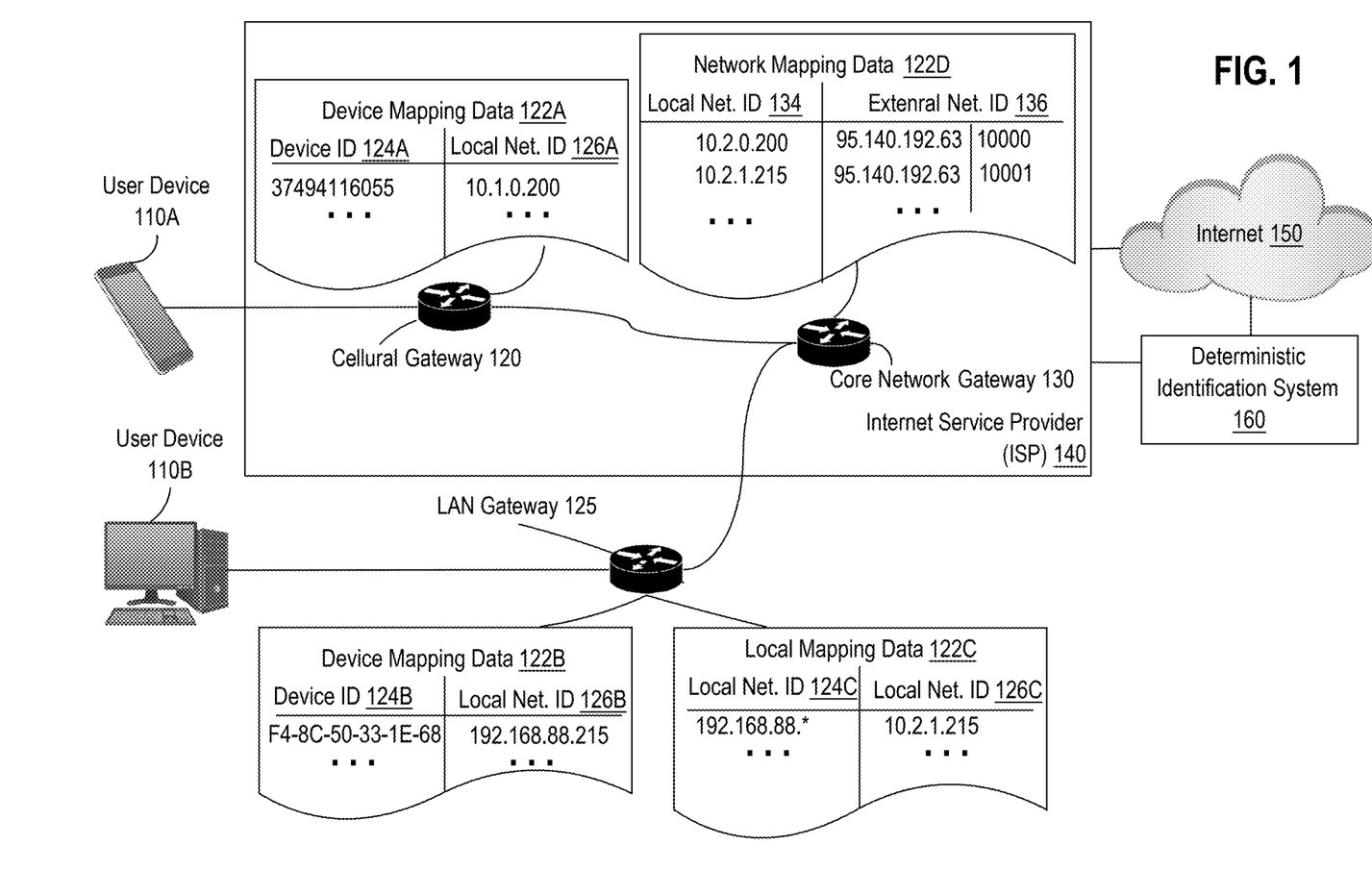
FIG. 1 is a block diagram that depicts a data flow for generating and receiving mapping data, in one or more embodiments.

FIG. 1 is a block diagram that depicts a data flow for generating and receiving mapping data, in one or more embodiments. User devices 110A and 110B are connected to Internet 150 through ISP 140. Although only two user devices 110A-B are depicted, other embodiments may include more or less than two. Similarly, other embodiments may include additional ISPs apart from ISP 140.

User device 110A is a mobile phone that is assigned an IP address, a local network identifier, by cellular gateway 120 of ISP 140, upon the connection to ISP 140. The assignment is recorded in device mapping data 122A, a pre-NAT table, with IMSI device identifier 124A, 37494116055, of mobile phone 110A. The mapping maps device identifier 124A to local network identifier 126A. Local network identifier 126A is a local IPv4 address, 10.1.0.200, for user device 110A in this example.

When user device 110A accesses Internet 150, core network gateway 130 assigns an external network identifier to user device 110A. Thereby, the local network identifier of user device 110A is mapped to an external network identifier by ISP 140. Local network identifier 134, the local IPv4 address of 10.1.0.200 for user device 110A, is mapped to external network identifier 136, the external IPv4 address 95.140.192.63, with the port 10000 in network mapping data 122D. Future requests to the content provider(s) connected to Internet 150 are to indicate user device 110A with external network identifier 136, 95.140.192.63:10000.

Other user devices, such as user device 110B, are also assigned external network identifier 136 for accessing Internet 150. Unlike user device 110A, user device 110B is connected to Internet 150 through LAN gateway 125. For example, user device 110B may be a desktop computer connected by a Wi-Fi connection with a wireless router's access network at home, LAN gateway 125, which in turn is connected (through one or more switches and gateways) to core network gateway 130. LAN gateway 125 maintains the mapping of device identifiers 124B of connected devices with local home network identifiers 126B. In this example, user desktop device 110B's MAC address F4-8C-50-1E-68 is mapped to local IPv4 address 192.168.88.215 in the APR table of gateway 125, device mapping data 122B.

When accessing Internet 150, gateway 125 routes the packets from user device 110B to core network gateway 130 by assigning the packets the local identifier assigned by gateway 125. The mapping between local identifiers of LAN gateway 125 and local identifier(s) of core network gateway 130 is maintained by local mapping data 122C, thereby mapping local network identifiers 124C to local network identifiers 126C of ISP 140. Packets from user device 110B are received by ISP 140 through the 10.2.1.215 IPv4 address assigned according to local mapping data 122C.

The packets are then assigned to the external network identifier for user device 110B (and other devices on LAN gateway 125) from network mapping data 122D. In this example, the external IPv4 address 95.140.192.63 with port number 10001 is assigned to user device 110B. Accordingly, content provider(s) on Internet 150, when receiving requests from user device 110B, identify user device 110B by the external network identifier of 95.140.192.63:10001.

Because the same IPv4 address is assigned to user devices 110A and 110B in this example, a content provider on Internet 150 may not differentiate the source user devices by IPv4 addresses. Furthermore, network mapping data 122D may change, and user device 110B, at some point in time, may have the same port number as user device 110A in the past. Therefore, even if the content provider has maintained the port numbers for user devices, rematching the stored external identifiers to the new request may yield erroneous identification of the user/user device.

To rectify this technical problem, the content provider(s) may request deterministic identification from Deterministic Identification System (DIS) 160. DIS 160 receives and stores mapping data from ISPs, such as ISP 140, in an embodiment. For example, DIS 160 may receive mapping data 122A and mapping 122D from ISP 140. Additionally, DIS 160 may receive device mapping data 122B and local mapping data 122C either directly from LAN gateway 125 or through ISP 140. Although depicted separately in FIG. 1, DIS 160 may be integrated into an ISP, such as ISP 140.

Instance(s) of the mapping data may be sent to DIS 160 in response to a request by DIS 160 or be periodically pushed to DIS 160. DIS 160 may associate mapping data with a mapping timestamp of the receipt time if the mapping timestamp(s) are not provided. Using the mapping timestamp, DIS 160 identifies the validity of mapping as of a particular time. The mapping timestamps and, thus, the validity may be associated with each identifier's mapping in the instances of mapping data. The mapping remains valid until a new mapping is received (which may be a new instance of the same mapping data).

For example, when one or more mapping data 122A-122D are received by DIS 160, DIS 160 may associate the receipt timestamp(s) with the instance(s) of mapping data and store the mapping timestamp(s) in association thereof. If other instance(s) of the same mapping data are received in the future, the former mappings are considered valid between the associated mapping timestamp(s) and the newly received timestamp(s).

Additionally or alternatively, the instance(s) of received mapping data may be associated with the identifying information of the ISP from which the instances are received. For example, instances of mapping data 122A-D may be associated with the information identifying ISP 140. When a user (device) identification request is received, DIS 160 may analyze the received external identifier to determine the respective ISP that assigned the external network identifier. Such ISP identification may be performed by DNS (Domain Name Server) lookup. Once the ISP is identified, DIS 160 queries only the instances of mapping data from that particular ISP. For example, when the external network identifier of 95.140.192.63:10000 is indicated in the deterministic identification request, DIS 160 determines that the 95.140.192.* range of external IPv4 addresses are associated with ISP 140. Accordingly, DIS 160 may query only mapping data 122A-D and others received from ISP 140.

In an embodiment, DIS 160 coalesces the instances of network mapping data and device mapping data into combined mapping data that maps external network identifiers from ISP 140 to respective device identifiers (without the need to perform a join operation on the local network identifiers). In such an embodiment, rather than querying in instance(s) of network mapping data and then using the results for querying the instance(s) of the device mapping data, DIS 160 queries the combined mapping data stored in DIS 160 based on the external network identifier and obtains the corresponding device (or user) identifier.

Providing User (Device) Specific Content

Figure 2:
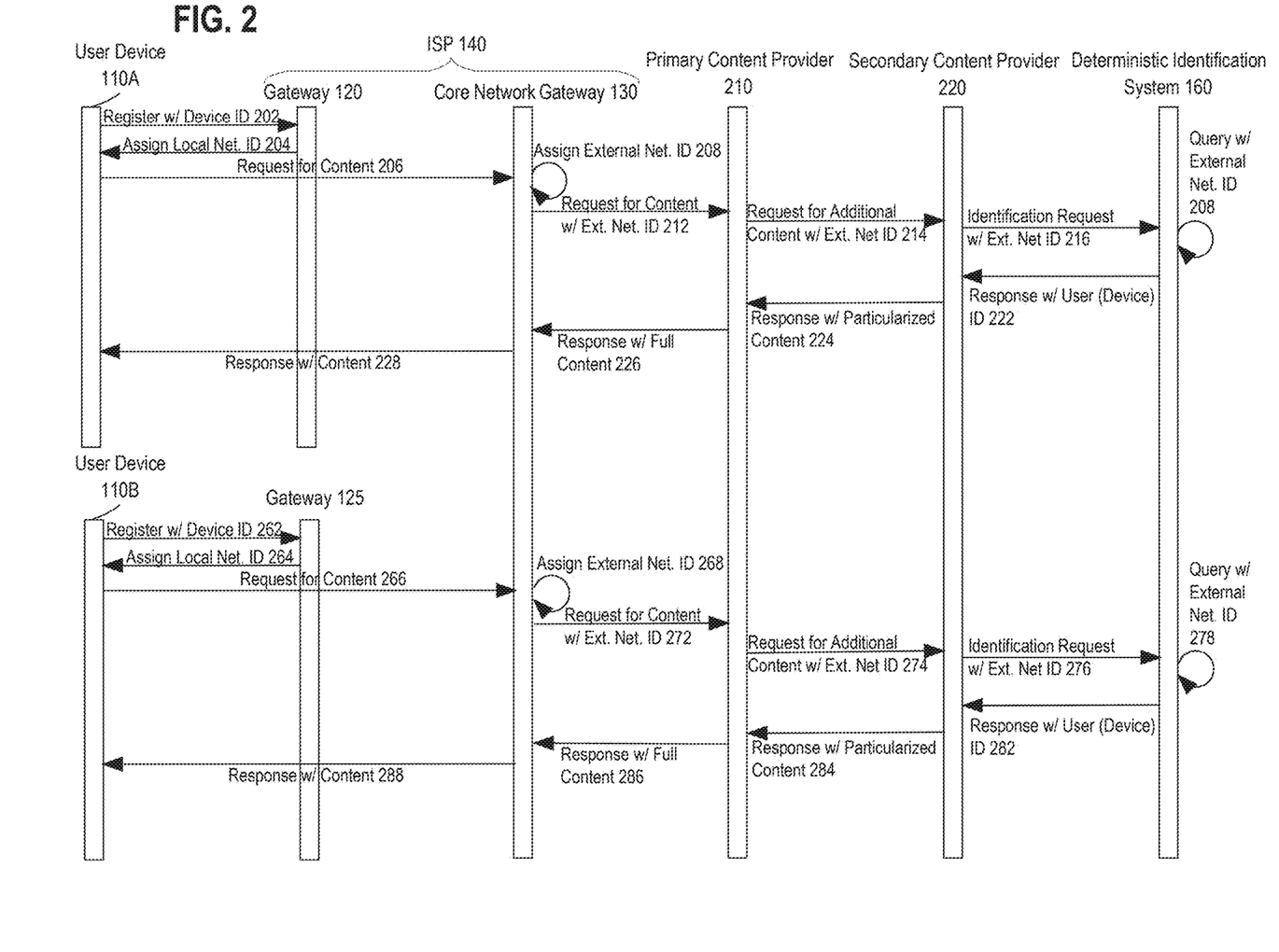
FIG. 2 is a flow chart that depicts a process for providing user (device) specific content, in one or more embodiments.

FIG. 2 is a flow chart that depicts a process for providing user (device) specific content, in one or more embodiments. As part of connecting to Internet 150, user device 110A registers with gateway 120 of its ISP provider, ISP 140, by providing user device 110A device identifier at step 202. Upon the receipt of the request to register, gateway 120 assigns a local network identifier at step 204. Continuing with the above example of user device 110A being a mobile phone, mobile phone 110A may be assigned a local IPv4 address and mapped to its corresponding IMSI (or MSISDN) in the pre-NAT table of gateway 120.

Similarly, user device 110B may request registration with its local gateway 125 at step 262 and receive the local network identifier at step 264 for the user device 110B. However, unlike gateway 120, gateway 125 is not part of ISP 140. Continuing with the above example, gateway 125 may be a local Wi-Fi router connected to ISP 140. To connect, user device 110B provides its network interface's MAC address, which gateway 125 maps to a local IPv4 address in the APR table, as an example.

When any user of user devices 110A/B browsed on the device's web browser to the website of primary content provider 210, a request for content is generated and addressed to primary content provider 210's external network identifier. At step 206, such a request is generated by user device 110A and, at step 266, by user device 110B. The requests, having the external IP for content provider 210, are routed to core network gateway 130 of ISP 140 through gateway 120 and gateway 125, respectively.

At steps 208 and 268, respectively, core network gateway 130 assigns external network identifiers to the requests from user devices 110A and 110B, respectively. At steps 212 and 272, the requests are forwarded to content provider 210 with the assigned external network identifiers to indicate the respective source device. If ISP 140 receives user device 110 B's request later than user device 110A's request, ISP 140 may assign the same external network identifier as was assigned to user device 110A. Accordingly, when primary content provider 210 receives the request at step 212 (and similarly, secondary content provider 220 in the later step 214) may not differentiate between the sources of the different requests.

Additionally, if user device 110A generates another content request at a later point in time than its request for content at step 206, ISP 140 may assign a different external network identifier to the later request than the external network identifier assigned at step 208. Accordingly, when primary content provider 210 receives the request at step 212 (and similarly secondary content provider 220 in the later step, 214) may assume the requests are from different sources rather than from same user device 110A.

For example, mobile phone user device 110A is assigned the external IPv4, and port number of 95.140.192.63:10000 at step 208 by ISP 140 (as depicted in network mapping data 122D of FIG. 1). Desktop user device 110B is assigned to the external IPv4, and port number of 95.140.192.63:10001 at step 268 by ISP 140 (as depicted in network mapping data 122D of FIG. 1). Content provider 210 (and 220) may differentiate the source of these two separate requests from the two separate devices. However, at a later time, mobile phone user device 110A may send another request to content provider 210. Since the desktop user device 110B's earlier request has been completed, and no active requests have been received from desktop device 110B, as an example, ISP 140 may assign the desktop user device 110B's former external network identifier, 95.140.192.63:10001, to the new request from mobile phone user device 110A. According to this example, the content provider(s) (primary and secondary) may not only fail to identify the new request as originating from mobile phone device 110A but also erroneously associate the request as originating from desktop device 110B.

The issue of deterministic identification is further aggravated when the requests from user devices 110A/B are received at secondary content provider 220. For example, primary provider 210 may be able to identify the user devices by storing a cookie on each of the user devices 110A/B, as discussed in the Background section. Primary content provider 210 may be a news website, and its web server(s) may have stored cookies on the corresponding browsers of user devices 110A/B. Accordingly, the news website may be able to identify the requests at two different points in time that originated from the same device. Primary content provider 210 may then provide content(s) particularized to user device 110A.

However, in such an example, secondary content provider 220 may not have the permissions or technical ability to store user (device) identifying information on user devices 110A/B. Continuing with the previous example, secondary content provider 220 may be a sports news website that would prefer to prioritize the sports content according to the originating user (device).

For that reason, secondary content provider 220, in response to receiving the request for additional content from primary content provider 210 at step 214/274, requests identification of the originating user (device) from DIS 160 at step 216/276 for the respective requests. Additionally or alternatively, primary content provider 210 may also request the identification of the user (device) for the received requests from DIS 160, similar to secondary content provider 220.

Deterministic User (Device) Identification

At steps 216 and 276 of FIG. 2, respectively, DIS 160 receives identification requests for the corresponding content requests received by secondary content provider 220. An identification request may include the external network identifier for the user device originating the content request. For example, for user devices 110A/B, DIS 160 may receive 95.140.192.63:10000 and 95.140.192.63:10001, respectively, as depicted in FIG. 1. Using this information, DIS 160 queries one or more instances of mapping data at steps 208 and 278, respectively. In response to the query, DIS 160 obtains the unique device identifiers associated with user devices 110A/B. Such unique device identifiers are temporally static and unique among user devices.

Figure 3:
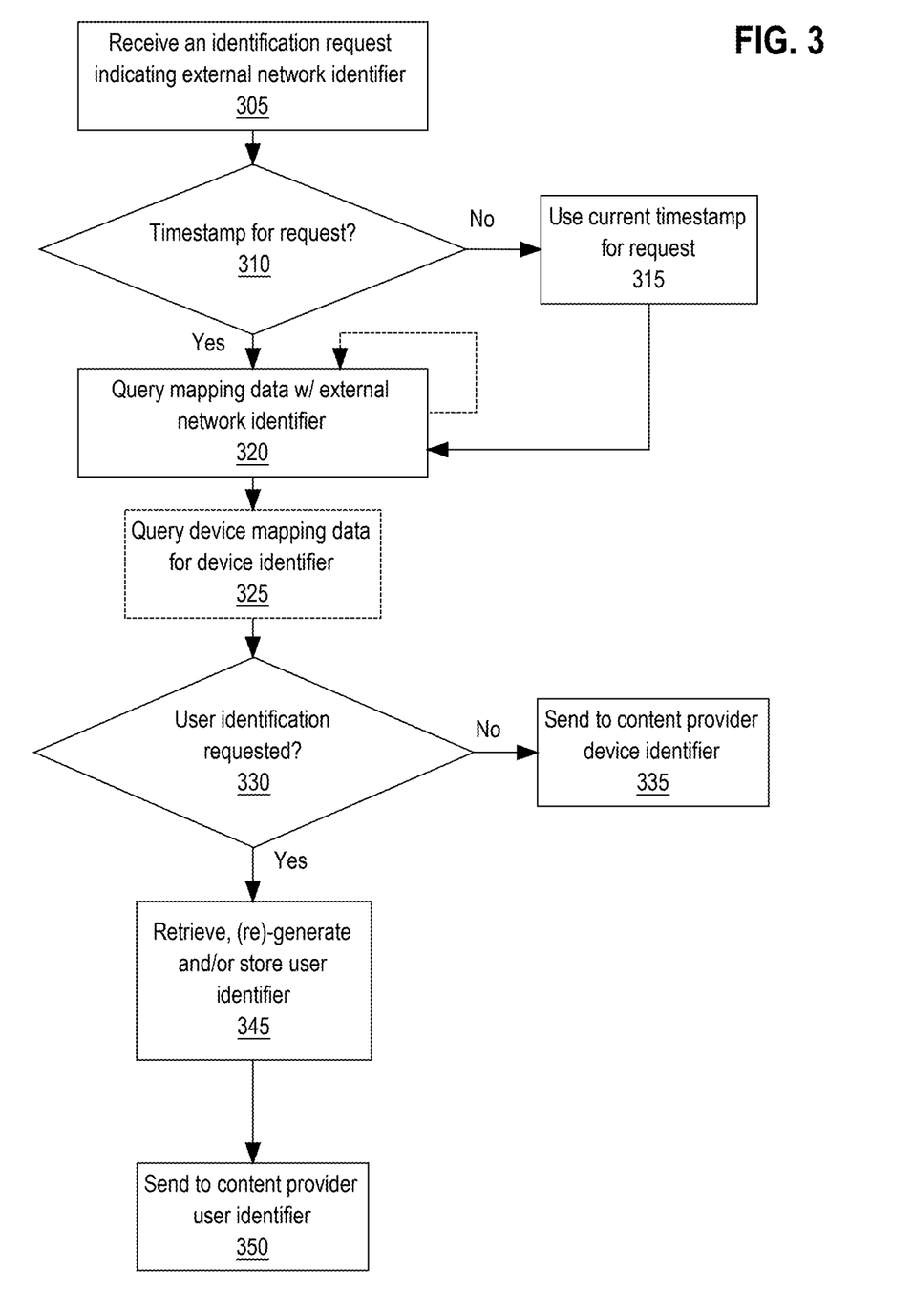
FIG. 3 is a flow diagram that depicts a process for deterministic identifying of user/user device in an embodiment.

FIG. 3 is a flow diagram that depicts a process for deterministically identifying user/user device, in an embodiment. One or more of the steps described below may be omitted, repeated, and/or performed in a different order. Accordingly, the specific arrangement of steps shown in FIG. 3 should not be construed as limiting the scope of the invention. Further, the steps shown below may be modified based on the data structure(s) of mapping data.

At step 305, DIS 160 receives a request for identification, which indicates the external network identifier of the originating user device. The request may additionally indicate the timestamp at which the external network identifier was received by the content provider. At step 310, the process determines if such a timestamp is contained with the request. The process proceeds to step 315 if no timestamp has been indicated, and therefore, the current mapping timestamp is used to determine the deterministic identifier of the user device or the user thereof.

At step 320, DIS 160 queries instance(s) of mapping data to determine the identifier(s) for the content requesting user device based on the external network identifier indicated in the identification request. In one embodiment, DIS 160 maintains the instances of network mapping data associated with the timestamp. If so, based on the determined timestamp in the previous steps, DIS 160 selects instances of mapping data that are the latest but are not later than the determined timestamp for the identification request. DIS 160 uses the external network identifier to query the selected instances and obtain results from the selected instances of mapping data. Alternative to timestamped mapping data, DIS 160 may maintain only the latest instances of mapping data. Accordingly, DIS 160 queries the maintained instances of network mapping data with the external network identifier of the user device.

In an embodiment, DIS 160 queries instances of combined (network, device, and/or user) mapping with the external network identifier for the device at step 320. Accordingly, the result obtained, in response to the querying, is the user (device) identifier for the user device.

In another embodiment, DIS 160 queries instances of network mapping data with the external network identifier at step 320, and the local identifier for the user device is obtained in response to the query. Step 320 may be performed iteratively multiple times. Each time the obtained local identifier is used to query network mapping data to retrieve the next local identifier for the device until no further mapping exists for the last local identifier.

For example, DIS 160 may store instances of mapping data 122A-D of FIG. 1. When DIS 160 receives an identification request with the external network identifier of 95.140.192.63:10001 (e.g., step 276 of FIG. 2), DIS 160 may query mapping data 122A-D with the received external network identifier. The first query returns the local identifier of 10.2.1.215 from network mapping data 122D. DIS 160 may query again but using the newly returned local identifier for the user device of 10.2.1.215. The query results in another local identifier being returned, the local identifier 192.168.88.* from local mapping data 122C. DIS 160 may query again. However, no result will be returned from mapping data 122A-D as no other record exists mapping the local identifier 192.168.88.* to any other local identifier. Thus, DIS 160 identifies the local identifier 192.168.88.* as the identifier to query the device mapping data.

As another example, when DIS 160 receives an identification request with the external identifier of 95.140.192.63:10000 (e.g., step 206 of FIG. 2), after querying mapping data 122A-D, the 10.2.0.200 local identifier is returned for the user device. However, querying further with the 10.2.0.200 local identifier results in no other local identifier returned. Thus, DIS 160 proceeds to query device mapping data 122A-B with the 10.2.0.200 local identifier.

Continuing with FIG. 3, at optional step 325, if the device identifier has not been retrieved by the querying in step 320, DIS 160 may query instance(s) of device mappings using the local device identifier determined in step 320 for the user device. Continuing with the above examples, for the local identifier 192.168.88.* (in which '*' indicates any number), DIS 160 may match the local identifier 192.168.88.215 in device mapping data 122B and return the device identifier F4-8C-50-33-1E-68. Similarly, for the local identifier 10.2.0.200, the device identifier 37494116055 is returned from device mapping data 122A.

At step 330, the process determines whether the identification request indicates a request for a user identifier for the content request in addition to or alternative to the device identifier. If not, at step 335, DIS 160 sends the device identifier to the requesting content provider as the deterministic device identifier for the user device requesting content.

If, at step 330, the identification request indicates a request for a user identifier, in one embodiment, DIS 160 may (re)-generate a user identifier on the fly. In such an embodiment, DIS 160 uses the same methodology to generate a user identifier, thereby ensuring that the user identifier is the same across separate requests for secondary content for the same. For example, DIS 160 may receive a user identifier of primary content provider 210 with the request and append the received primary user identifier to the device identifier user in consistent manner across requests (e.g., using a delimiter). DIS 160 returns the appended identifier as the user identifier to secondary content provider 220.

In another embodiment, at step 345, DIS 160 maintains persistently stored user mapping data. DIS 160 queries instance(s) of user mapping data with the determined device identifier for the user device at step 345. If no user identifier exists for the device identifier in the instances of user mapping data, DIS 160 generates a unique user identifier and stores the generated user identifier in association with the determined device identifier at step 325. DIS 160 may generate a user identifier using a hash-based algorithm. At step 350, DIS 160 sends to the content provider the user identifier (retrieved or (re)-generated) in response to the identification request from the content provider.

Providing Particularized Content

Continuing with FIG. 2, at steps 222/282, secondary provider 220 receives a deterministic user (device) identifier from DIS 160 using the techniques described above. Although secondary provider 220 has been requested content in the context of another provider, primary content provider 220, DIS 160 has provided secondary provider 220 with deterministic identification of the user device(s) in this step.

At steps 224/284, secondary provider 220, using the received deterministic user (device) identifier, may provide content that is particular to the requesting user device/user. Continuing with the example in which primary content provider 210 is a news content provider and secondary provider 220 is a sports news content provider, the dynamic and non-unique external IPv4/port address of user device 110A is received by the sports news provider.

Rather than providing generic sports content in response to the request, the sports news provider sends an identification request to DIS 160. DIS 160 determines that the received IPv4/port address corresponds to user device 110A (and/or the corresponding user thereof). Based on this identification, the sports content provider may determine that user device 110A has previously been interested in soccer news and return more soccer content in the sports content to user device 110A.

At step 226/286, secondary provider 220 responds to primary content provider 210's request for additional content with additional content that is particular to respective user device 110A and user device 110B and/or the respective users thereof.

At steps 228/288, primary content provider 210 incorporates the received additional content from secondary content provider 220 with its own content and forwards the content to respective user devices 110A/B.

Providing Particularized Content

In an embodiment, a primary content provider or an associated entity maintains an identifier for users (or user devices) that request content from the primary content provider. Such an identifier is referred to herein as a provider-based user identifier or provider user identifier. Using a provider-based user identifier for a user (device), the secondary provider may provide particularized content that is particular to the user. To determine the user (device) identifier, DIS 160 may generate and maintain mapping data that maps provider-based user identifiers to the corresponding user (device) identifiers.

Figure 4:
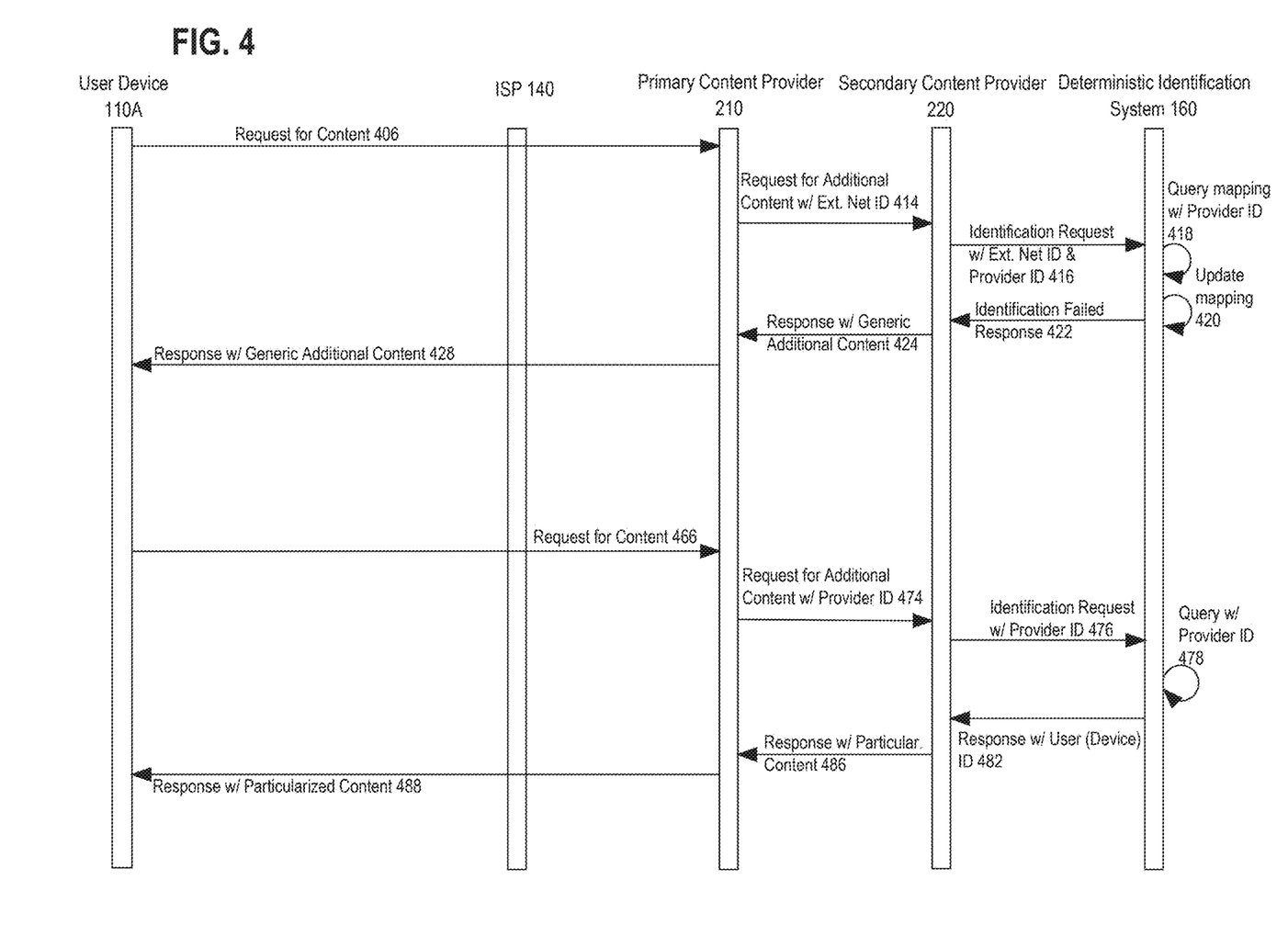
FIG. 4 is a flow chart that depicts a process for providing user (device) specific content based on provider-generated identifiers, in one or more embodiments

FIG. 4 is a flow chart that depicts a process for providing user (device) specific content based on provider user identifiers, in one or more embodiments. At step 406, user device 110A requests content from primary content provider 210 through ISP 140. Primary content provider 210 may identify user device 110A or the associated user of user device 110A with a provider user identifier in addition to receiving the external network identifying information for the request. By providing the external network identifying information and the provider identifier for user device 110A, primary content provider 210 may request additional content from secondary content provider 220 at step 414.

To provide particularized additional content to primary content provider 210, at step 416, secondary content provider 220 may request a user identification for the request for the additional content from DIS 160. At step 418, DIS 160 receives the user (device) identification request that includes the external network identifying information of the original request for the content and the provider-generated identifier for user device 110A. DIS 160 queries provider user mapping data that maps provider-generated identifiers to the corresponding user (device) identifiers with the received provider-generated identifier to retrieve the user (device) identifier. If user device 110A has never before requested any content from primary content provider 210 or if the provider-generated identifiers have expired for secondary content provider 220, then the query may not identify any mapping in the provider user mapping data. If no mapping is obtained, DIS 160 may respond with a failure notification for the user identification request of step 416 at step 422, in an embodiment. Secondary content provider 220 then may return generic content that is not particularized to user device 110A (or the user thereof) and send the generic content at step 424. The response from primary content provider 210 with the generic content from secondary content provider 220 is sent back to user device 110A at step 428.

Additionally, when the provider-generated identifier is not identified in the provider user mapping data, a new mapping is added at step 420. DIS 160 may use the techniques discussed herein to determine the user (device) identifier for the request based on the external network identifier received in the identification request (e.g., as described in FIG. 3). Once the user (device) identifier is determined, the user (device) identifier is mapped to the provider-generated identifier received in the identification request by updating the provider user mapping with such mapping at step 420.

Accordingly, when same user device 110A makes a request for content from primary content provider 210, such as in step 466, DIS 160 has the information about the provider-generated identifier with which primary content provider 210 identifies user device 110A with its corresponding provider-generated identifier.

.DIS 160 receives the identification request with the provider-generated identifier of user device 110A at step 476 as a result of primary content provider 210 requesting additional content with the provider identifier at step 474. Using the provider-generated identifier, DIS 160 queries provider user mapping data and obtains the user (device) identifier for user device 110A at step 478 without the use of external network identifying information. Thus, with the provider user mapping data generated for a user (device), DIS 160 skips determining the local network identifier(s) for the external network identifier of the requesting user device and the user (device) identifier from therefrom. Instead, DIS 160, on subsequent requests, queries provider mapping data at step 478 and retrieves the user (device) identifier for the request.

DIS 160 returns the determined user (device) identifier to secondary content provider 220 at step 482. Secondary content provider 220 may provide a response with particularized content based on the received user (device) identifier to primary content provider 210 at step 486. Primary content provider 210 returns the response with the content that includes the particularized content for user device 110A at step 488.

Software Overview

Figure 5:
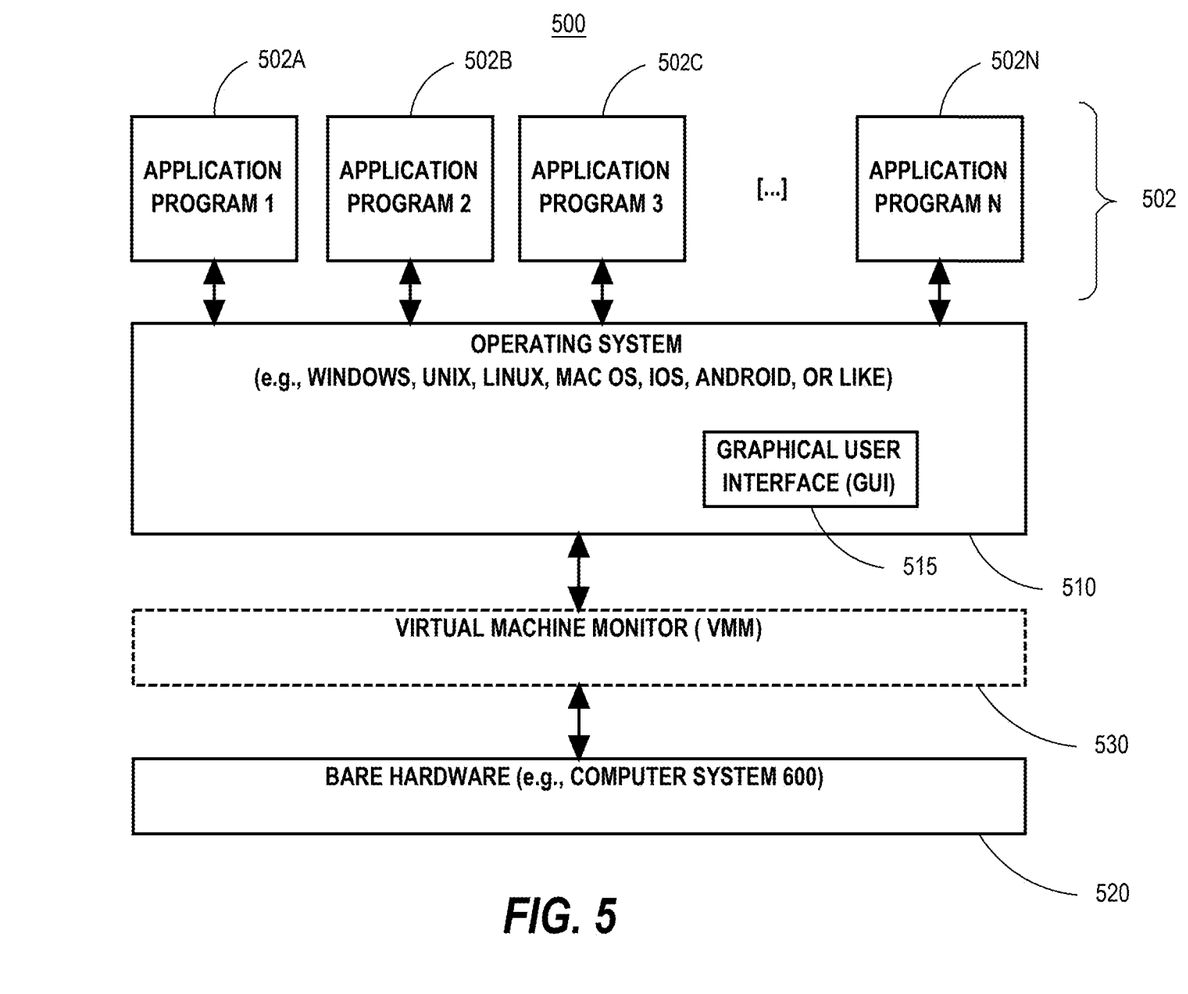
FIG. 5 is a block diagram of a basic software system, in one or more embodiments.
Figure 6:
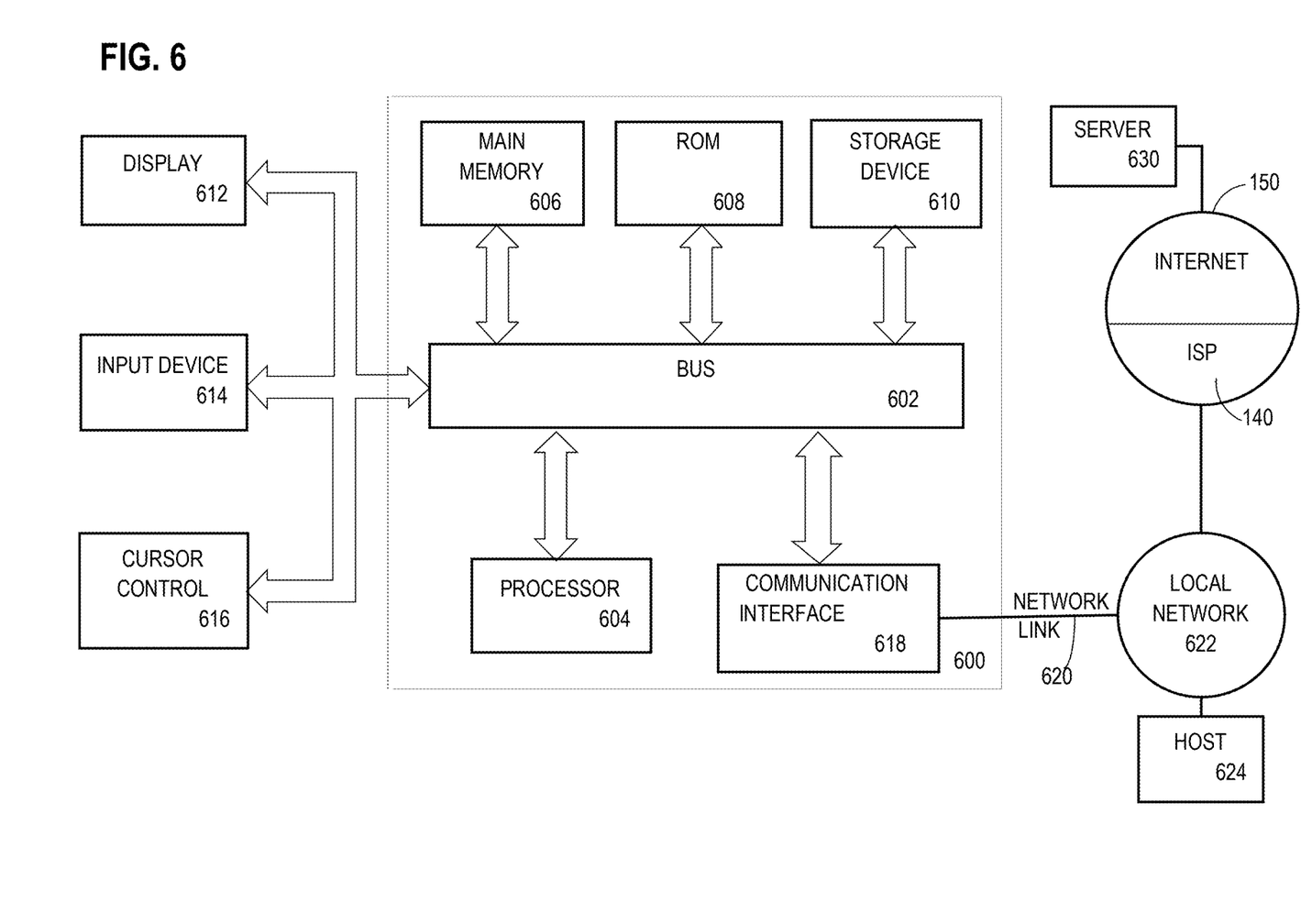
FIG. 6 is a block diagram that illustrates a computer system upon which an embodiment of the invention may be implemented.

FIG. 5 is a block diagram of a basic software system 500 that may be employed for controlling the operation of computing system 600 of FIG. 6. Software system 500 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or another online service).

Software system 500 includes a graphical user interface (GUI) 515, for receiving user commands and data in a graphical (e.g., "point-and-click" or "touch gesture") fashion. These inputs, in turn, may be acted upon by system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but shares access to the memory allotted to the process. The memory is used to store the content of processors between the allotments when the thread is not running. The term thread may also be used to refer to a computer system process in multiple threads that are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information and a hardware processor 604 coupled with bus 602 for processing information. Hardware processor 604 may be, for example, a general-purpose microprocessor.

Computer system 600 also includes a main memory 606, such as a random access memory (RAM) or another dynamic storage device, coupled to bus 602 for storing information and instructions to be executed by processor 604. Main memory 606 also may be used for storing temporary variables or other intermediate information during the execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read-only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware, and/or program logic, which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal, and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 140. ISP 140, in turn, provides data communication services through the worldwide packet data communication network now commonly referred to as the "Internet" 150. Local network 622 and Internet 150 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620, and communication interface 618. In the Internet example, a server 630 might transmit a requested code for an application program through Internet 150, ISP 140, local network 622, and communication interface 618.

The received code may be executed by processor 604 as it is received and/or stored in storage device 610 or other non-volatile storage for later execution.

What is claimed is:

1. A computer-implemented method comprising:
   requesting one or more instances of mapping data from one or more Internet Service Providers (ISPs) of one or more gateway devices;
   in response to requesting the one or more instances of mapping data from the one or more ISPs of the one or more gateway devices, receiving at least one instance of the one or more instances of mapping data;
   wherein the one or more instances of mapping data represent mappings of identifiers assigned by the one or more gateway devices to user devices, the one or more gateway devices routing a plurality of content requests from the user devices to content providers;
   wherein the at least one instance of mapping data is associated with one or more corresponding mapping timestamps at which one or more mappings in the at least one instance of mapping data are valid;
   receiving an identification request for a content request received by a content provider, the identification request indicating an external network identifier for a user device, and a request timestamp at which the content request is received by the content provider;
   querying the one or more instances of mapping data based, at least in part, on the external network identifier for the user device, and on the request timestamp;
   in response to querying the one or more instances of mapping data based, at least in part, on the external network identifier for the user device and on the request timestamp:
   determining that the at least one instance of the one or more instances of mapping data is valid based on the request timestamp being within a time period that includes the one or more corresponding mapping timestamps, and based at least in part on querying the at least one instance of mapping data, obtaining a unique identifier associated with the user device, wherein the unique identifier is temporally static and unique among the user devices;

sending to the content provider the unique identifier associated with the user device.

2. The method of claim 1,
wherein the content provider is a secondary content provider,
wherein the identification request is generated in response to the secondary content provider receiving an additional content request from a primary content provider,
wherein the additional content request to the secondary content provider is generated by the primary content provider in response to a user content request by the user device,
wherein the additional content request comprises the external network identifier of the user device.

3. The method of claim 1, wherein the one or more instances of mapping data comprises one or more device mapping data and one or more network mapping data, the method further comprising:
in response to querying the one or more network mapping data from the one or more gateway devices based, at least in part, on the external network identifier, obtaining a local identifier of the user device;
in response to querying the one or more device mapping data from the one or more gateway devices based, at least in part, on the local identifier of the user device, obtaining the unique identifier associated with the user device.

4. The method of claim 1, wherein the external network identifier for the user device comprises an external Internet Protocol (IP) address and source port number assigned by an external gateway device, of the one or more gateway devices, of an Internet Service Provider (ISP).

5. The method of claim 1, wherein the unique identifier for the user device is a user identifier identifying a user associated with the user device, the method further comprising:
in response to querying the one or more instances of mapping data based, at least in part, on the external network identifier for the user device, obtaining a device identifier for the user device;
based on user mapping data that maps device identifiers, that uniquely identify a corresponding plurality of user devices, with associated users, determining the user identifier associated with the user device.

6. The method of claim 5, further comprising:
querying the user mapping data based, at least in part, on the device identifier for the user device;
based on the querying the user mapping data based, at least in part, on the device identifier for the user device, determining that no user identifier exists for the device identifier in the user mapping data;
generating the user identifier that unique among existing user identifiers in the user mapping data and storing the user identifier in the user mapping data in association with the device identifier for the user device.

7. The method of claim 1, wherein the unique identifier for the user device is a device identifier associated with the user device, and wherein the device identifier for the user device is an International Mobile Subscriber Identity (IMSI), Mobile Station International Subscriber Directory Number (MSISDN), or a MAC address.

8. The method of claim 1, further comprising:
determining that a particular instance of the mapping data is not associated with any timestamps at which the one or more mappings in the particular instance of the mapping data are valid;
associating a timestamp at which the particular instance of the mapping data is received thereby generating the one or more corresponding mapping timestamps at which the one or more mappings in the particular instance of the mapping data are valid.

9. The method of claim 1, wherein each instance of the one or more instances of mapping data are associated with corresponding ISP from which said each instance has been received, the method further comprising:
based on the external network identifier for the user device, determining a particular ISP with which at least a portion of the external network identifier is associated;
querying at least one particular instance of mapping data that is associated with the particular ISP based, at least in part, on the external network identifier for the user device;
in response to querying the at least one particular instance of mapping data based, at least in part on, the external network identifier, obtaining a local identifier of the user device.

10. The method of claim 1,
wherein the identification request includes a provider-generated identifier maintained by a particular content provider, the provider-generated identifier uniquely identifying the user device for the particular content provider,
wherein the one or more instances of mapping data include provider mapping data that maps a plurality of provider-generated identifiers to a plurality of unique identifiers associated with corresponding to a plurality of user devices; and
the method further comprising updating the provider mapping data with a mapping of the provider-generated identifier to the unique identifier associated with the user device.

11. The method of claim 10, further comprising:
receiving a subsequent identification request for a content request received by the content provider, the identification request indicating the provider-generated identifier;
querying the provider mapping data based, at least in part, on the provider-generated identifier;
in response to querying the provider mapping data based, at least in part, on the provider-generated identifier, obtaining the unique identifier associated with the user device;
sending to the content provider the unique identifier associated with the user device.

12. A system comprising:
one or more processors, and
one or more storage media storing a set of instructions, which, when executed by the one or more processors, causes:
requesting one or more instances of mapping data from one or more Internet Service Providers (ISPs) of one or more gateway devices;
in response to requesting the one or more instances of mapping data from the one or more ISPs of the one or more gateway devices, receiving at least one instance of the one or more instances of mapping data;
wherein the one or more instances of mapping data represent mappings of identifiers assigned by the one or more gateway devices to user devices, the one or more gateway devices routing a plurality of content requests from the user devices to content providers;

wherein the at least one instance of mapping data is associated with one or more corresponding mapping timestamps at which one or more mappings in the at least one instance of mapping data are valid;

receiving an identification request for a content request received by a content provider, the identification request indicating an external network identifier for a user device, and a request timestamp at which the content request is received by the content provider;

querying the one or more instances of mapping data based, at least in part, on the external network identifier for the user device, and on the request timestamp;

in response to querying the one or more instances of mapping data based, at least in part, on the external network identifier for the user device and on the request timestamp:

determining that the at least one instance of the one or more instances of mapping data is valid based on the request timestamp being within a time period that includes the one or more corresponding mapping timestamps, and based at least in part on querying the at least one instance of mapping data, obtaining a unique identifier associated with the user device, wherein the unique identifier is temporally static and unique among the user devices;

sending to the content provider the unique identifier associated with the user device.

13. The system of claim 12, wherein the content provider is a secondary content provider, wherein the identification request is generated in response to the secondary content provider receiving an additional content request from a primary content provider, wherein the additional content request to the secondary content provider is generated by the primary content provider in response to a user content request by the user device, wherein the additional content request comprises the external network identifier of the user device.

14. The system of claim 12, wherein the one or more instances of mapping data comprises one or more device mapping data and one or more network mapping data, and wherein the set of instructions includes instructions, which, when executed by the one or more processors, further cause:

in response to querying the one or more network mapping data from the one or more gateway devices based, at least in part, on the external network identifier, obtaining a local identifier of the user device;

in response to querying the one or more device mapping data from the one or more gateway devices based, at least in part, on the local identifier of the user device, obtaining the unique identifier associated with the user device.

15. The system of claim 12, wherein the unique identifier for the user device is a user identifier identifying a user associated with the user device, and wherein the set of instructions includes instructions, which, when executed by the one or more processors, further cause:

in response to querying the one or more instances of mapping data based, at least in part, on the external network identifier for the user device, obtaining a device identifier for the user device;

based on user mapping data that maps device identifiers, that uniquely identify a corresponding plurality of user devices, with associated users, determining the user identifier associated with the user device.

16. The system of claim 12, wherein each instance of the one or more instances of mapping data are associated with corresponding ISP from which said each instance has been received, and wherein the set of instructions includes instructions, which, when executed by the one or more processors, further cause:

based on the external network identifier for the user device, determining a particular ISP with which at least a portion of the external network identifier is associated;

querying at least one particular instance of mapping data that is associated with the particular ISP based, at least in part, on the external network identifier for the user device;

in response to querying the at least one particular instance of mapping data based, at least in part on, the external network identifier, obtaining a local identifier of the user device.

17. The system of claim 12, wherein the identification request includes a provider-generated identifier maintained by a particular content provider, the provider-generated identifier uniquely identifying the user device for the particular content provider, wherein the one or more instances of mapping data include provider mapping data that maps a plurality of provider-generated identifiers to a plurality of unique identifiers associated with corresponding to a plurality of user devices; and wherein the set of instructions includes instructions, which, when executed by the one or more processors, further cause updating the provider mapping data with a mapping of the provider-generated identifier to the unique identifier associated with the user device.

18. One or more non-transitory computer-readable media storing a set of instructions, wherein the set of instructions includes instructions, which when executed by one or more processors, cause:

requesting one or more instances of mapping data from one or more Internet Service Providers (ISPs) of one or more gateway devices;

in response to requesting the one or more instances of mapping data from the one or more ISPs of the one or more gateway devices, receiving at least one instance of the one or more instances of mapping data;

wherein the one or more instances of mapping data represent mappings of identifiers assigned by the one or more gateway devices to user devices, the one or more gateway devices routing a plurality of content requests from the user devices to content providers;

wherein the at least one instance of mapping data is associated with one or more corresponding mapping timestamps at which one or more mappings in the at least one instance of mapping data are valid;

receiving an identification request for a content request received by a content provider, the identification request indicating an external network identifier for a user device, and a request timestamp at which the content request is received by the content provider;

querying the one or more instances of mapping data based, at least in part, on the external network identifier for the user device, and on the request timestamp;

in response to querying the one or more instances of mapping data based, at least in part, on the external network identifier for the user device and on the request timestamp:
  determining that the at least one instance of the one or more instances of mapping data is valid based on the request timestamp being within a time period that includes the one or more corresponding mapping timestamps, and
  based at least in part on querying the at least one instance of mapping data, obtaining a unique identifier associated with the user device, wherein the unique identifier is temporally static and unique among the user devices;
sending to the content provider the unique identifier associated with the user device.

* * * * *